United States Patent
Casale et al.

(10) Patent No.: US 6,271,516 B1
(45) Date of Patent: Aug. 7, 2001

(54) G.M. TUBE ENVIRONMENT RADIOACTIVITY METER HAVING A SENSITIVITY DEGRADATION MONITORING DEVICE WITH A NATURAL RADIOISOTOPE AND MEANS FOR AUTOMATICALLY CORRECTING THE MEASURED RADIOACTIVITY

(75) Inventors: Renato Casale; Renato Castellani, both of Rome (IT)

(73) Assignee: Ital Elettronica S.p.A., Rome (IT)

( * ) Notice: Subject to any disclaimer, the term of this patent is extended or adjusted under 35 U.S.C. 154(b) by 0 days.

(21) Appl. No.: 09/035,355

(22) Filed: Mar. 5, 1998

(30) Foreign Application Priority Data

Mar. 7, 1997 (IT) ............................................. RM97A0130

(51) Int. Cl.$^7$ ........................................................ G01T 7/00
(52) U.S. Cl. .................................. 250/252.1; 250/231.13; 313/93
(58) Field of Search ...................... 250/252.1 R, 252.1 A, 250/231.13; 313/93

(56) References Cited

U.S. PATENT DOCUMENTS 4,190,767 * 2/1980 Crouse .............................. 250/231.13

FOREIGN PATENT DOCUMENTS

| | | | |
|---|---|---|---|
| 1941318 | * | 5/1971 (DE) | ................................. 250/252.1 |
| 1219635 | * | 1/1971 (GB) | ................................. 250/252.1 |
| 55-44942 | * | 3/1980 (JP) | ................................. 250/252.1 |
| 57-28274 | * | 2/1982 (JP) | ................................. 250/252.1 |
| 61-82185 | * | 4/1986 (JP) | ................................. 250/252.1 |
| 61-155788 | * | 7/1986 (JP) | ................................. 250/252.1 |
| 63-234185 | * | 9/1988 (JP) | ................................. 250/252.1 |
| 6-222151 | * | 8/1994 (JP) | ................................. 250/252.1 |

* cited by examiner

*Primary Examiner*—Constantine Hannaher
*Assistant Examiner*—Otilia Gabor
(74) *Attorney, Agent, or Firm*—Smith, Gambrell & Russell, LLP

(57) ABSTRACT

A G.M. tube environment radiameter including a sensitivity degradation monitoring device, comprising: a cyclic counter circuit for counting the pulses coming from the G.M. tube; b) a power operated moveable support for a weak radioactive source, adapted to alternatively move said source between two stable positions, a first position in which the source is reproducibly located close to the G.M. tube so as to cause it to generate pulses of the same magnitude order as the pulses generated under action of the standard background environment radioactivity, and a second position in which the source intensity is negligible with respect to the one caused by the standard background radioactivity; a circuit for measuring and storing the pulse intensities generated by the radioactive source when it is close to the G.M. tube, both in the test stage and in subsequent times as well as for performing the ratio of said pulse intensity values.

20 Claims, 3 Drawing Sheets

G.M. TUBE ENVIRONMENT RADIOACTIVITY METER HAVING A SENSITIVITY DEGRADATION MONITORING DEVICE WITH A NATURAL RADIOISOTOPE AND MEANS FOR AUTOMATICALLY CORRECTING THE MEASURED RADIOACTIVITY

DESCRIPTION

This invention relates to an environment radioactivity meter or briefly called radiameter, based upon a G.M. tube and provided with a device adapted to monitor the sensitivity degradation, in which a so weak control source is utilized as to be made by a nature occurring radioisotope, and further provided with a correction circuit adapted to automatically correct its response to the measured radioactivity. The concerned radiameter is also optionally provided with an alarm circuit, which furnishes a warning signal when the sensitivity degradation is higher than a pre-established threshold value.

The radiameter according to this invention is mainly intended for use in the environment monitoring networks for territorial control, comprising a large number of measurement stations and, compared with all radiameters presently in use, it has the advantageous feature that it provides an indication of the environment radioactivity with an effectively uniform response over the whole territory, regardless of the time elapsed in the individual stations after their latest revision. Furthermore, since it provides an indication of the sensitivity degradation in the measurement circuits at each station, which, in turn, is an indication of the residual possible operation time of the station before a further revision thereof becomes necessary, it enables a reasonable revision schedule to be established for each station.

BACKGROUND OF THE INVENTION

Aiming at avoiding too large differences in the responses to the environment radioactivity and at establishing a proper revision schedule, almost all radioactivity meters are presently subjected to periodic controls by using a radioactive source, to which the radiameter is manually exposed by an operator, or, in more sophisticated apparatuses, by adopting a radioactive source incorporated with the radiameter itself and by remotely or automatically controlling the apparatus by an operator. Since, during the time period in which the above control action is effected, the radiameter is not operative, said time period should be relatively short and, therefore, the source to be used should have such an activity as to cause the G.M. tube to generate pulses having a high intensity compared to the one generated by the standard environment radioactivity.

The sensitivity monitoring device included in a radiameter according to this invention, in contrast, uses a source that, when it is positioned adjacent to the G.M. tube, it causes a measurement having the same magnitude order as the one caused by the background environment radioactivity to be indicated. Such indication intensity is so low that it cannot be considered under strict legal terms as a radioactive source and, therefore, any biologic damage to the network maintenance personnel or to the station revision personnel is avoided.

The measurement of the activity of said source, which is contemporaneous with the measurement of the environment radioactivity does not jeopardize the response of the radiameter to said environment radioactivity and the measurement operation takes a very long time with respect to the radiameter integration time and, therefore, it is very accurate and enables even minimum sensitivity variations to be automatically corrected. This makes the measurement accuracy in the various stations very uniform and makes the radioactivity topographic maps produced by the environment monitoring network more reliable.

The indication of the sensitivity degradation improves the revision schedule of the stations, thereby making the management of the environment radiametric networks much more cost effective, with respect to all complex and very expensive maintenance operations up to now carried out.

The decay time of the nature occurring radioisotope which is used as the control source is assimilable to infinite and, therefore, it eliminates any need that its measurement values be corrected to compensate the source decay, thereby facilitating the sensitivity controls during the revision operations of the stations.

PRIOR ART

According to this invention, a G.M. tube digital intensity meter in which use is made, for instance, of a double information type device, such as the one disclosed in Italian Patent No. 1.073.902, granted on Apr. 17, 1985, in the name of ITAL ELETTRONICA S.p.A., comprises a sensitivity monitoring device adapted to automatically control the response to the measured radioactivity, including a weak radioactive source mounted upon an electrically operated movable support, which alternatively switches its location with respect to the G.M. tube, in a rapid and reproducible manner, into a close position, in which it remains during a time T', or into a spaced position, in which it remains during a time T". The type of the used radioisotope, the intensity of the source, the geometries of the support and of the G.M. tube are such that, in the close position, the intensity of the pulses generated by the source contained in the G.M. tube is of the same magnitude order as the one generated by the nature occurring background radioactivity, but, in the spaced position, it is negligible with respect thereto. A timer included within the device operates in order that T' and T" are both constant and, by way of exemplification, we shall assume hereinbelow that T'=T". During the time T' in which the source is in close position, a suitable circuit included in the device generates pulses having an intensity corresponding to the mean intensity generated within the G.M. tube by the source and electrically subtracts it from the pulse intensity measured by the concerned radiameter. In both positions of the source, the radiameter continuously operates and provides a correct measure, to which statistical oscillations are associated, the statistical oscillations occurring during the T' times being greater than the statistical oscillations occurring during said T" times, in view of the fact that, during the T' times, the statistical oscillations of the environment radioactivity are combined with the oscillations of the statistical pulses generated by the source. The alternated time period in which the source is close to or spaced from the G.M. tube is of the same magnitude order as the integration time of the radiameter (in particular, they may be the same), in order to prevent the variations of the measured radioactivity from interfering with the measure furnished by the source.

The measurement of the mean intensity of pulses generated in the G.M. tube by the source is carried out by adding in two counters all N' pulses arriving during M time periods T' as well as all N pulses arriving during M time periods T". Since, as it has been assumed, T'=T", the mean intensity of the pulses generated by the source turns out to be (N'−N")/

MT' and this is, therefore, the value subtracted by the circuit from the pulse intensity measured by this radiameter during the time periods T', in order to measure the intensity caused by the environment radioactivity. When the value M is chosen sufficiently large, any statistical oscillations under which one can measure the pulse strength generated by the source can be reduced as desired. When the response of the radiameter to the environment radioactivity as measured is to be automatically corrected, the circuit according to this invention includes a non-volatile memory in which the value $N°=(N'-N")$, as measured during the calibration operation carried out at the starting test stage or during a complete overhaul stage, is stored. During the subsequent lifetime of the radiameter, should its sensitivity be altered, the measurement performed therein without any correction of the response will be altered according the $(N'-N")/N°$ ratio. Since the true value of the environment radioactivity is desired, the circuit for automatically correcting the radiameter response provides for multiplying the incorrect measurement by $N°/(N'-N")$. The $(N'-N")/N°$ ratio is also furnished under request from the radiameter operator to indicate the sensitivity degradation value of the measurement circuit. Furthermore, an alarm device can be added to indicate when the above value overcomes a predetermined limit value.

The statistical oscillations of the pulses generated by the G.M. tube during the time periods T' increase as the environment radioactivity increases and, in connection herewith, the accuracy with which the mean pulse intensity as generated by the source decreases. In view of the above, a circuit is also provided which freezes the intensity value subtracted during the time periods T', when the intensity of the environment radioactivity overcomes a predetermined value.

The support device for the reference or control source comprises, according to this invention, a disc of non-transparent material, coupled at it center to the shaft of an electric step-by-step motor that is positioned adjacent to the G.M. tube, is driven by a suitable drive circuit and has such sizes that said source is near to the tube in its close position. The disc is provided with a hole, that indicates the correct location of the source close to an optical-electronic positioning device.

SUMMARY OF THE INVENTION

Summarizing all above already described, it is a specific object of this invention to provide a G.M. tube environment radiameter including a sensitivity degradation monitoring device, comprising: a) a cyclic counter circuit for counting the pulses coming from the G.M. tube; b) a power operated movable support for a weak radioactive source, adapted to alternatively move said source between two stable positions, a first position in which the source is reproducibly located close to the G.M. tube so as to cause it to generate pulses of the same magnitude order as the pulses generated under action of the standard background environment radioactivity, and a second position in which the source intensity is negligible with respect to the one caused by the standard background radioactivity; c) a circuit for measuring and storing the pulse intensities generated by the radioactive source when it is close to the G.M. tube, both in the test stage and in subsequent times as well as for performing the ratio of said pulse intensity values.

In a different embodiment, the environment radiameter comprises: a) a cyclic counter circuit for counting the pulses coming from the G.M. tube; b) a weak radioactive source arranged in fixed position with respect to said G.M. tube; c) a shielding disc moved by a power operated support adapted to alternatively move the disc in reproducible manner between two stable positions, namely a first position, in which said disc shields the G.M. tube from said weak radioactive source so that the pulse intensity generated by the source is negligible with respect to the one generated by the standard background radioactivity, and a second position, in which said G.M. tube is directly exposed to said weak radioactive source, that generates a pulse intensity therein having the same magnitude order as the one generated by the standard background radioactivity; d) a circuit for measuring and storing the pulse intensities generated by the radioactive source when it directly acts upon the G.M. tube, both in the test stage and in subsequent times as well as for performing the ratio of said pulse intensity values.

In the preferred embodiments, the radiameter according to this invention includes a circuit for automatically correcting the response to the measured radioactivity; this latter circuit utilizes the results as stored both at the calibration stage and in subsequent times by said circuit adapted to measure and to store the pulse intensity generated by the radioactive source both in its close position to said G.M. tube and in its directly exposed position thereto.

Further details and advantages of the radiameter according to this invention will be apparent from the following description with reference to the annexed drawings in which the preferred embodiment is shown by way of illustration and not by way of limitation.

Figure 1:
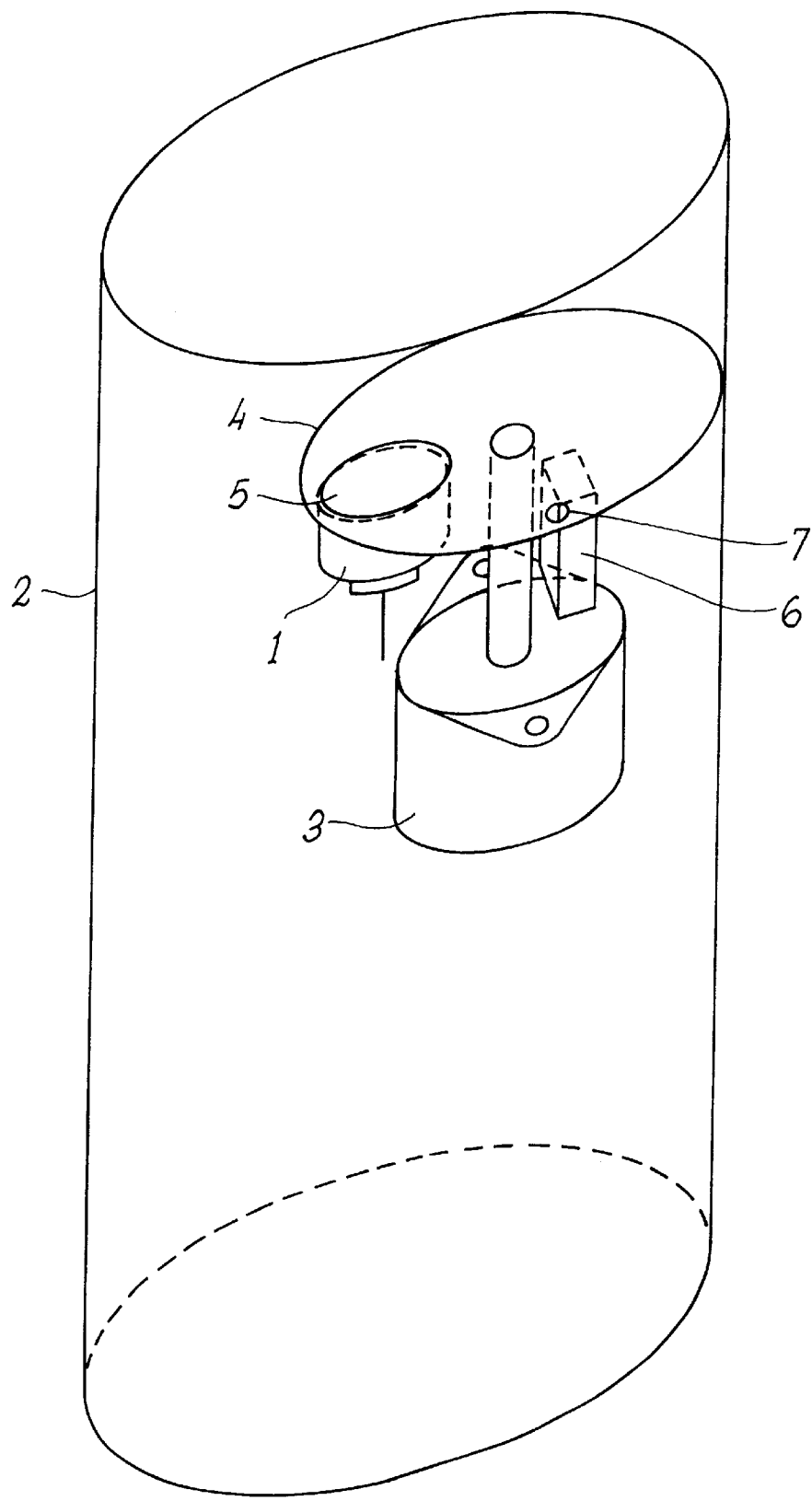
FIG. 1 shows the two stable position, electromechanically operated support for the reference source, included as a portion of the sensitivity degradation monitoring device.

Since a radiametric circuit intended for use with a monitoring network is dealt, only one input/output port in standard RS232 is provided, with UART and level converter for communicating with remote operators.

DETAILED DESCRIPTION OF THE INVENTION

By referring to FIG. 1, the construction of the radiameter is as follows: there is provided a front window G.M. tube 1 of halogen based type, coaxially arranged with respect to the radiameter casing 2, in suitable position for furnishing a response to the gamma radiation, approximately isotropic with respect to the hemisphere concentric to the useful volume of the tube and facing to the window. A disc 4 of nontransparent plastic material bearing a control reference source 5 is mounted upon the shaft of an electrical step-by-step motor 3; the position of said control source in front of the thin window of the G.M. tube 1 being controlled by an opto-electronic device 6 by means of a hole 7 provided in said disc 4. All accessories components not strictly needed to understand the mechanical operation of the device, such as the mechanical support members, the electronic components and any filters employed to compensate the response by taking the various photon energies of the G.M. tube 1 into account. The electric motor can move the source either in a first position in front of the thin window of the G.M. tube 1, the exact position being established by said opto-electronic device 6 which cooperates, in a per se well known manner to those skilled in the art, with said hole 7 of the disc 4, or in a second position turned by 180° with respect to the first position, by said drive circuit sending a predetermined number of pulses to the motor.

Figure 2:
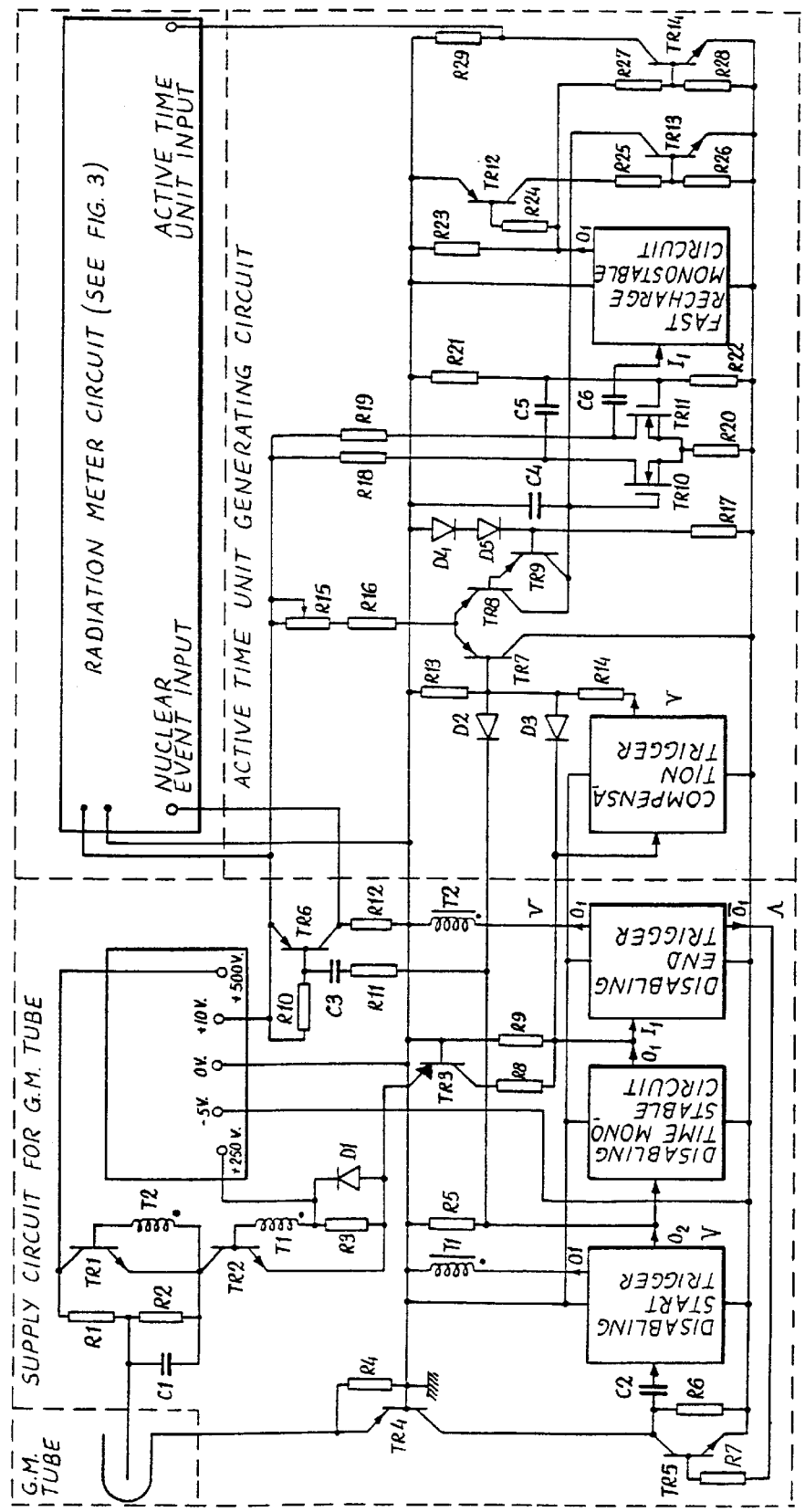
FIG. 2 shows, by way of example, a circuit that generates, in the form of pulses, information relating to the nuclear events and to the active time units in a radiameter of the double information type.

FIG. 2 shows the information generator of a double information radiameter according to this invention and broadly corresponds to FIG. 2 of the intensity meter disclosed in Italian Patent No. 1.073.902 filed in the name of ITAL ELETTRONICA S.p.A. on Aug. 25, 1976, to which reference can be made for further information.

By referring now to FIG. 2, it shows the four essential sections of the information generator for a double information radiameter, such sections being indicated by dashed boxes and including a G.M. tube, a power supply circuit therefor, a radiametric circuit and an active time unit generator circuit.

The operation is as follows.

When the G.M. tube is activated, transistors TR1, TR2 and TR3 are all turned off, since their bases are coupled to their emitters, respectively, by means of transformer coils T2, T1 and resistors R3, R8 and R9, so that the standard working voltage of 550 volts is coupled to the anode of the tube by means of resistor R1, while the cathode of the tube is coupled to ground voltage by means of resistor R4.

When a discharge is started in said G.M. tube, a larger portion of it passes through transistor TR4 and resistor R6, since transistor TR5 is turned off and resistor R4 has a relatively high value, and starts, by means of condenser C2, the deactivation begin trigger that, in turn, turns transistor TR2 on, by means of transistor T1 and diode D1.

Transistor TR2 draws a current of high intensity when it is turned on by transformer coil T1 and its collector voltage very rapidly lowers from 550 volts to 250 volts. Voltage divider comprising resistors R1 and R2 and capacitor C1, by which the parasitic capacitance of G.M. tube is compensated, also very rapidly reduces the anode voltage of said G.M. tube from about 550 volts to about 300 volts, this latter voltage being lower than the G.M. threshold.

The deactivation begin trigger, upon being turned on, also sets the deactivation time monostable circuit which during its holding time drives such a current through transistor TR2, by means of resistor R8 and transistor TR3, as to maintain the above mentioned reduced voltage of about 300 volts upon the anode of the G.M. tube.

The deactivation time monostable circuit is of a type having no reset dead time (it is comprised, for instance, by two standard monostable circuits, cascade controlled with output OR or AND circuits, according to preselected combined outputs). The above mentioned monostable circuit, besides driving transistor TR3 during the deactivation time, also starts, upon being reset, the activation end trigger which turns transistor TR1 on by means of transformer coil T2. Transistor TR2 draws a high current and, therefore, it quickly restores the output voltage of about 550 volts upon the collector of transistor TR2 and consequently upon the anode of the G.M. tube.

During the on time of transistor TR1, also transistor TR5, to the base of which the complement output of the deactivation end trigger is connected, is turned on, thereby preventing the parasitic capacitance charge current of said G.M. tube from switching again the deactivation begin trigger on.

Should a further discharge caused by a nuclear event be started in said G.M. tube, before the current in transistor TR1 is exhausted, resistors R1 and R2, acting as a conventional switching off circuit, provide for limiting the current through the G.M. tube in order prevent it to be damaged and the deactivation begin trigger is duly activated at the end of the current pulse in transistor TR1 by the tube discharge, the duration of which is longer than the current pulse in transistor TR1.

The circuit comprising transistor TR6, resistors R10, R11 and capacitor C3 is designed in order to supply the radiametric circuit with one pulse for each nuclear event detected by the G.M. tube.

The active time unit generator circuit comprises capacitor C4, which is discharged in constant current condition during the activation time periods, whilst it is insulated during the deactivation time periods, and it is quickly recharged to its initial voltage level each time the voltage thereacross reaches a pre-established value.

A linear discharge of said capacitor C4 takes place through transistors TR5, TR9 as biased by the thermal compensation circuit comprising diodes D4, D5 and resistor R17 and the discharge current of capacitor C4 is adjusted by varying the resistance values of resistors R15 and R16.

During the deactivation time periods, transistor TR7 turns transistors TR8 and TR9 off, due to the fact that a negative pulse is applied to its base. Such a voltage pulse has a time duration exactly corresponding to the time during which the anode voltage of G.M. tube is lower than the G.M. voltage threshold value. To this effect, the base of transistor TR7 is OR-driven both by the deactivation begin trigger through diode D2, and by the deactivation time monostable circuit through diode D3, as well as by a suitable compensation trigger, by means of resistor R14.

The compensation trigger, that is similar to the deactivation end trigger, is started in parallel to the latter and it is adjusted in order to compensate all circuit time differences connected to the operation of transistors TR1 and TR2. The pre-established voltage which causes the operation of the fast recharge circuit to start is determined by the begin of the reaction operation of a discriminator comprising transistors TR10 and TR11, resistors R20, R21 and R22 and capacitor C5. The latter capacitor C5, through a further capacitor C6, causes the fast recharge monostable circuit to begin reacting and to rapidly recharge capacitor C4, through transistors TR12 and TR13.

A circuit including transistor TR14 and resistors R27, R28 and R29 provides for supplying the radiation intensity measuring circuit with a pulse for each fast discharge of capacitor C4.

Figure 3:
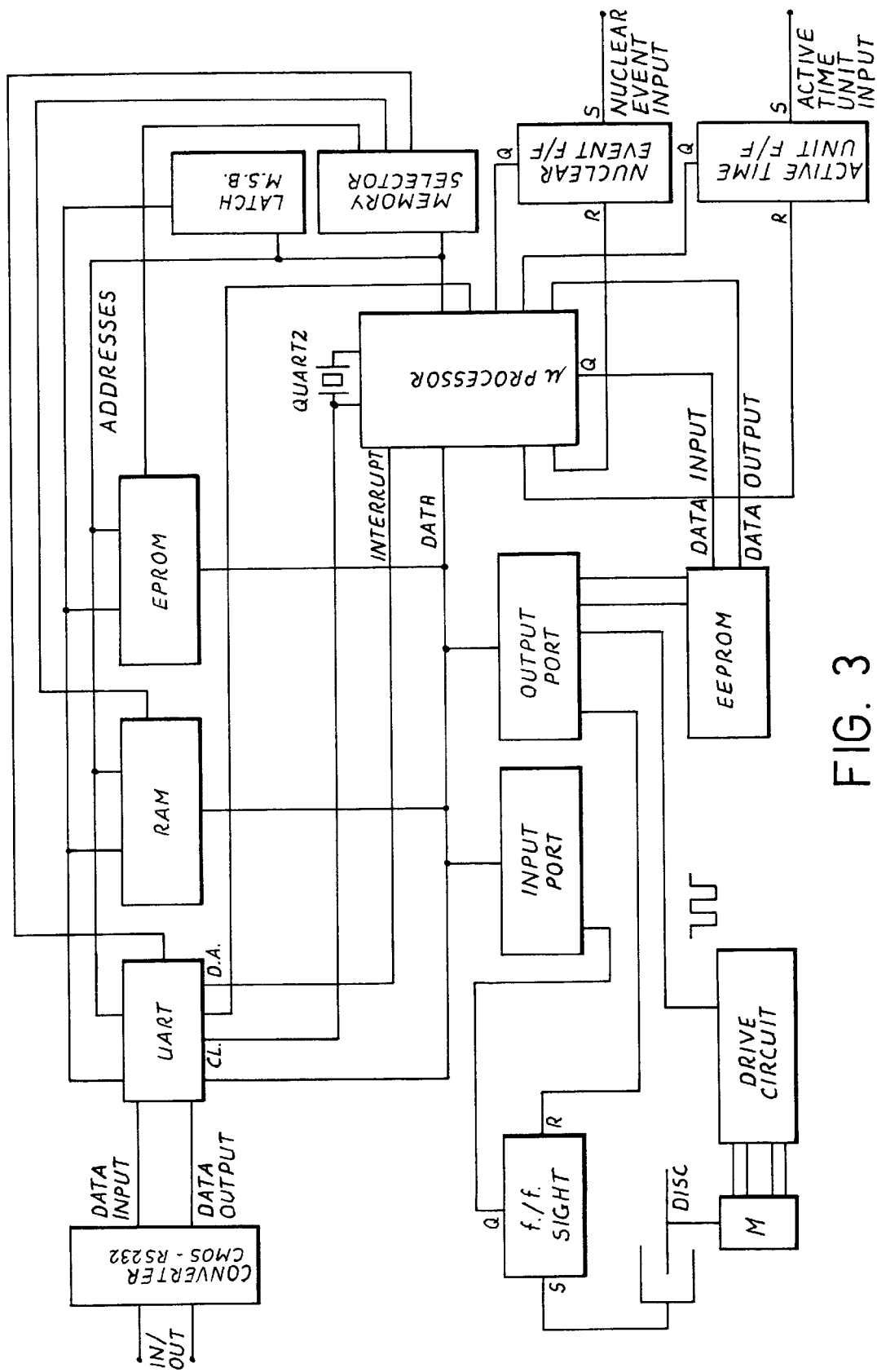
FIG. 3 shows the principle electric diagram of the double information radiameter circuit, including a device for monitoring the sensitivity degradation and for automatically correcting the response to the measured radioactivity, this latter device being based upon a single microprocessor which controls both the radiametric circuits and the electromechanical components used in the sensitivity degradation monitoring device.

By referring now to FIG. 3, it shows the 8-bit type microprocessor that manages 16-bit addresses with addition of a latch which is utilized in connection with the 8 most significant bits. A memory selector manages the addressing operations to RAM, EPROM and UART.

The concerned microprocessor includes all registers to be utilized as counters, both for cyclically counting the pulses generated for measurement of the environment radioactivity, and for counting the pulses deriving from nuclear events utilized for sensitivity control purposes. It also includes the circuits utilized for all timing, quartz-controlled functions.

The pulses representing the nuclear events and the active time units arriving to the respective inputs are provisionally stored by setting said two flip-flops and are subsequently reset by said microprocessor when it is ready to count them.

By referring to the circuit diagram, the step-by-step motor and the opto-electronic sight of the sensitivity degradation monitoring device, already indicated in FIG. 1, can be observed. Also these components are managed by said microprocessor, by means of the motor drive circuit and by means of storage flip-flop circuits for storing the signals of the opto-electronic sight, which is reset by the microprocessor by means of its output gate.

It is also possible to observe in the circuit diagram the non-volatile, EEPROM-type memory, in which both the latest measured value of the control source activity and the one measured on calibrating the system are stored and the ratio of these values is taken as a base both for automatically correcting the response to the measured radioactivity and for correcting any information concerning the sensitivity degradation, for use in scheduling the revision sequence.

During the "active times" of the G.M. tube, the microprocessor performs cyclic counting functions of all pulses representing the nuclear events as well as the active time units and then alternates these functions with data processing functions and with functions designed to manage the step-by-step motor movements. Even if the latter two functions are accomplished in short time with respect to the first ones, their durations are extracted from the "active times" of the G.M. tube, by resetting the flip-flop circuit designed for storing the pulses connected with the nuclear events and the active times, before each measurement active time slot.

As above already mentioned, this invention can also be implemented in an embodiment in which the radioactive source is mounted in a fixed position and a shielding disc is arranged such that it can be reproducibly moved, under action of said step-by-step motor, between a shielding position and a non-shielding position of said G.M. tube in respect of said radioactive source. The changes to the apparatus to enable it to operate in this latter embodiment can be easily understood by those skilled in the art in the light of the preceding description.

The preferred embodiments of this invention have been described and a number of variations have been suggested hereinbefore, but it should expressly be understood that those skilled in the art can make other variations and changes to the particulars and structural details, without so departing from the scope thereof.

What is claimed is:

1. A G.M. tube environment radiameter including a sensitivity degradation monitoring device, comprising:
   a) a power operated movable support for a weak radioactive source, adapted to alternatively move said weak radioactive source between two stable positions, including a first position in which said weak radioactive source is located close to the G.M. tube thereby causing the G.M. tube to provide pulses of magnitude equal to pulses generated by the G.M. tube in response to background radioactivity, and a second position spaced apart from the G.M. tube in which pulse intensity of said weak radioactive source is negligible with respect to pulse intensity caused by background radioactivity;
   b) a cyclic counter circuit for contemporaneously counting pulses generated by the G.M. tube in response to both the weak radioactive source and the background radioactivity when the weak radioactive source is in the first position; and
   c) a circuit for measuring and storing pulse intensities both in a test stage when the weak radioactive source is in the first position and in subsequent times when the weak radioactive source is in the second position, as well as for providing a ratio of said pulse intensities.

2. An environment radiameter according to claim 1, wherein a support for said weak radioactive source is made by a disc of non-transparent material, mounted upon an output shaft of an electric step-by-step motor, controlled by a microprocessor that manages radiametric functions of the circuit, by means of a drive circuit.

3. An environment radiameter according to claim 2, wherein reproducible movement of said radioactive source close to or spaced apart from said G.M. tube is assured by an opto-electronic device which cooperates with a hole provided in said support disc and controls movements of an electric step-by-step motor.

4. An environment radiameter according to claim 3, wherein the environment radiameter further comprises a circuit for automatically correcting the response to the measured radioactivity, which utilizes the results stored both at the calibration stage and in subsequent times by the circuit adapted to measure and to store the pulse intensities generated by said radioactive source in its close position directly exposed to said G.M. tube.

5. An environment radiameter according to claim 3, wherein said weak radioactivity source comprises a nature occurring radioisotope.

6. An environment radiameter according to claim 2, wherein reproducible movement of said weak radioactive source close to or spaced apart from said G.M. tube is assured by an opto-electronic device which cooperates with a hole provided in said support disc and controls movements of said electric step-by-step motor.

7. An environment radiameter according to claim 2, wherein the environment radiameter further comprises a circuit for automatically correcting the response to the measured radioactivity, which utilizes the results stored both at the calibration stage and in subsequent times by the circuit adapted to measure and to store the pulse intensities generated by said radioactive source in its close position directly exposed to said G.M. tube.

8. An environment radiameter according to claim 2, wherein said weak radioactivity source comprises a nature occurring radioisotope.

9. An environment radiameter according to claim 1, wherein the environment radiameter further comprises a circuit for automatically correcting a response to measured radioactivity, which utilizes results stored both at a calibration stage and in subsequent times by a circuit adapted to measure and to store pulse intensities generated by said radioactive source in its close position directly exposed to said G.M. tube.

10. An environment radiameter according to claim 1, wherein said weak radioactive source comprises a natural occurring radioisotope.

11. A G.M. tube environment radiameter including a sensitivity degradation monitoring device, comprising:
   a) a weak radioactive source arranged in a fixed position with respect to said G.M. tube;
   b) a shielding disc moved by a power operated support adapted to alternatively move the shielding disc between two stable positions, namely a first position, in which said shielding disc shields the G.M. tube from said weak radioactive source so pulse intensity generated by the weak radioactive source is negligible with respect to pulse intensity generated by background radioactivity, and a second position, in which said G.M. tube is directly exposed to said weak radioactive source thereby causing the G.M. tube to provide pulses of magnitude equal to pulses generated by the G.M. tube in response to background radioactivity;

c) a cyclic counter circuit for contemporaneously counting pulses generated by the G.M. tube in response to both the weak radioactive source and the background radioactivity when the shielding disc is in the second position; and d) a circuit for measuring and storing pulse intensities both in the test stage when the shielding disc is in the second position and in subsequent times when the shielding disc in the first position as well as for performing a ratio of said pulse intensities.

12. An environment radiameter according to claim 11, wherein said shielding disc is mounted upon an output shaft of an electric step-by-step motor, controlled by a microprocessor that manages radiametric functions of the circuit, by means of a drive circuit.

13. An environment radiameter according to claim 12, wherein reproducible movement of said shielding disc is assured by an opto-electronic device which cooperates with a hole provided in said shielding disc and controls movements of said electric step-by-step motor.

14. An environment radiameter according to claim 12, wherein the environment radiameter further comprises a circuit for automatically correcting the response to the measured radioactivity, which utilizes the results stored both at the calibration stage and in subsequent times by the circuit adapted to measure and to store the pulse intensities generated by said radioactive source in its close position directly exposed to said G.M. tube.

15. An environment radiameter according to claim 12, wherein said weak radioactivity source comprises a nature occurring radioisotope.

16. An environment radiameter according to claim 11, wherein reproducible movement of said shielding disc is assured by an opto-electronic device which cooperates with a hole provided in said shielding disc and controls movements of an electric step-by-step motor.

17. An environment radiameter according to claim 16, wherein the environment radiameter further comprises a circuit for automatically correcting the response to the measured radioactivity, which utilizes the results stored both at the calibration stage and in subsequent times by the circuit adapted to measure and to store the pulse intensities generated by said radioactive source in its close position directly exposed to said G.M. tube.

18. An environment radiameter according to claim 16, wherein said weak radioactivity source comprises a nature occurring radioisotope.

19. An environment radiameter according to claim 11, wherein the environment radiameter further comprises a circuit for automatically correcting the response to the measured radioactivity, which utilizes the results stored both at the calibration stage and in subsequent times by the circuit adapted to measure and to store the pulse intensities generated by said radioactive source in its close position directly exposed to said G.M. tube.

20. An environment radiameter according to claim 11, wherein said weak radioactivity source comprises a nature occurring radioisotope.

* * * * *